J. CLAYTON.
Plow-Colter.

No. 213,622. Patented Mar. 25, 1879.

WITNESSES:
Henry N. Miller
C. Sedgwick

INVENTOR:
J. Clayton
BY
ATTORNEYS.

UNITED STATES PATENT OFFICE.

JOHN CLAYTON, OF BRAINERD, MINNESOTA.

IMPROVEMENT IN PLOW-COLTERS.

Specification forming part of Letters Patent No. 213,622, dated March 25, 1879; application filed October 10, 1878.

*To all whom it may concern:*

Figure 1:
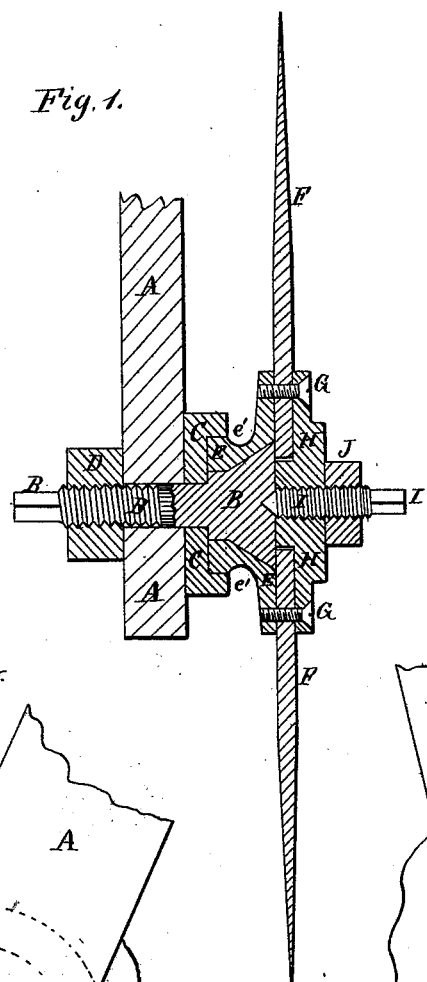
Figure 2:
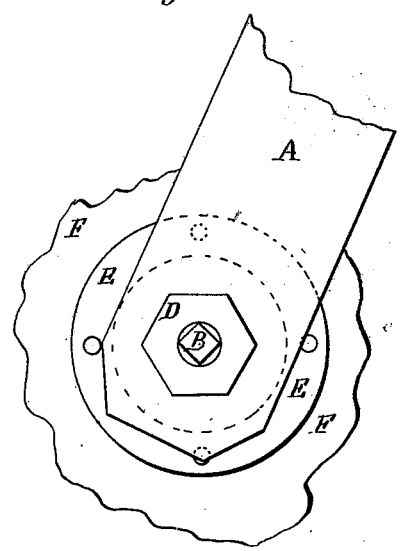
Figure 3:
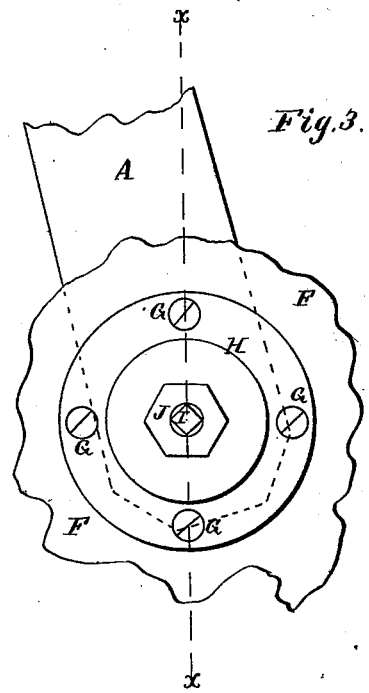

Be it known that I, JOHN CLAYTON, of Brainerd, in the county of Crow Wing and State of Minnesota, have invented a new and useful Improvement in Plow-Colters, of which the following is a specification:

Figure 1 is a section of my improved plow-colter, taken through the line $x\ x$, Fig. 3. Fig. 2 is a view of one side of the device. Fig. 3 is a view of the other side of the device.

Similar letters of reference indicate corresponding parts.

The object of this invention is to furnish an improved plow-colter, which shall be so constructed that it may be held true and steady while at work, and that dust cannot get into its bearing to wear, roughen, and cut the friction-surfaces.

The invention consists in the combination of the axle made with a flaring journal or bearing-surface, the flanged washer or cap, the hub made with a tapering cavity or bearing-surface, the clamping-plate, the set-screw, and the nuts with each other and the rotary colter for connecting the said colter with its hanger, as hereinafter fully described.

A represents the hanger of the colter, the upper end of which is secured to the plow-beam by clamps or other suitable means. B is the axle of the colter, the shank of which passes through a hole in the center of the cap or washer C and through the lower end of the hanger A, and has a right or left hand screw-thread cut upon its forward end to receive the nut D, by which it is secured in place.

The face of the washer C is recessed, or has a ring-flange formed around its edge, and against its face rests the shoulder of the axle B. The head or journal of the axle B is made flaring or flanged, as shown in Fig. 1, and upon it is fitted the hub E of the colter F.

The inner end of the hub E is made cylindrical, and fits into the recess of the cap or washer C, and its outer end is flared into a flange, and has holes formed through it to receive the bolts G, by which it is bolted to the colter F. The bolts G also pass through holes in the plate H, placed upon the outer side of the colter F.

The plate H, when the colter F has a hole through it, has a cylindrical projection formed upon the center of its inner side, which passes through a hole in the center of the colter F, and rests against the outer end of the journal of the axle B. Through the center of the clamping-plate H and of the colter F, when the said colter has no hole through it, is formed a screw-hole, into which is screwed a set-screw, I.

The forward end of the screw I may be flat or conical, and enters a recess in the center of the end of the journal of the axle B. The set-screw I centers the colter upon its bearings, causing it to wear true, and allowing the wear to be taken up, so that the said colter will always run smooth and steady.

The set-screw I is provided with a nut, J, to be screwed up against the clamping-plate H, to lock the said set-screw and prevent it from being turned by the revolution of the colter F.

The outer ends of the axle B and set-screw I are squared off, so that they may be grasped and held or turned by a wrench.

Around the hub E is formed a ring-groove, $e'$, to receive dust and prevent it from working in between the friction-surfaces. If desired, the hub E may be stationary and attached to the hanger A, and the journal B movable and attached to the colter F.

The hub E and the journal B may be in duplicate—that is, on each side of the colter F—so that the shank of the axle B may pass through each side of a yoke or double hanger. The tension on the sides of the yoke, when screwed together by the nuts D, will be sufficient to keep the bearing-sides of the journal B against the hub E, to correct the friction-wear on the journals and steady the colter in its work.

Having thus described my invention, I claim as new and desire to secure by Letters Patent—

The combination of the axle B, made with a flaring journal or bearing-surface, the flanged washer or cap C, the hub E, made with a tapering cavity or bearing-surface, the clamping-plate H, the set-screw I, and the nuts J D with each other and the rotary colter F, for connecting the said colter with its hanger, substantially as herein shown and described.

JOHN CLAYTON.

Witnesses:
T. C. FERNOLD,
J. H. GRAY.